US005488479A

United States Patent [19]

Williams et al.

[11] Patent Number: 5,488,479

[45] Date of Patent: Jan. 30, 1996

[54] MACHINE VISION SYSTEM FOR INSPECTION OF AGRICULTURAL COMMODITIES

[75] Inventors: Earl J. Williams, Tifton, Ga.; Stephen D. Adams, Auburn, Ala.

[73] Assignee: The United States of America as represented by the Secretary of Agriculture, Washington, D.C.

[21] Appl. No.: 991,815

[22] Filed: Dec. 17, 1992

[51] Int. Cl.[6] .................... G01J 3/46

[52] U.S. Cl. .................... 356/402; 348/89; 209/587

[58] Field of Search .................... 356/407, 402, 356/406, 416, 418, 425, 73; 250/226; 209/577, 580–582, 587; 348/89, 91, 92

[56] References Cited

U.S. PATENT DOCUMENTS

| | | | |
|---|---|---|---|
| 3,762,822 | 10/1973 | Harvey et al. | 356/429 |
| 5,060,290 | 10/1991 | Kelly et al. | 382/18 |
| 5,164,795 | 11/1992 | Conway | 356/407 |
| 5,195,417 | 3/1993 | Hancock et al. | 356/401 |

OTHER PUBLICATIONS

E. Jay Williams et al, "A 3D Vision System for Peanut Pod Maturity", Optics in Agriculture, 7–8 Nov. 1990, Boston, Massachusetts, SPIE vol. 1379, pp. 236–245.

E. Jay Williams et al, "A Non–Destructive Method for Determining Peanut Pod Maturity", Peanut Science (1981), pp. 134–141.

*Primary Examiner*—Vincent P. McGraw
*Assistant Examiner*—K. P. Hantis
*Attorney, Agent, or Firm*—M. Howard Silverstein; John D. Fado; Gail E. Poulos

[57] ABSTRACT

The present invention is directed to a device and method for analysis of peanut pods in a machine vision system. A method of classification of the pods is based on a maturity class system wherein various colors of the pod determine its maturity and therefore its approximate harvest time. The machine vision system permits quick scanning of the entire surface area of the peanut pod to be scanned and an analysis of its maturity can then be based on the overall view of the pod. The device and process utilize the views of the peanut pod, as determined by the camera imaging system so as to compare the images with maturity classes relating to color of the pod and, therefore, a determination of ripeness and of harvestability of the peanut crop.

10 Claims, 2 Drawing Sheets

MACHINE VISION SYSTEM FOR INSPECTION OF AGRICULTURAL COMMODITIES

BACKGROUND OF THE INVENTION

1. Field of the Invention

The invention is a computer-controlled machine vision system for inspecting pre-processed peanut pods for hull-scrape maturity class and profile. Other agricultural commodities such as seeds or kernels, could be inspected by this system, for example, for damage to the surface, for texture, and for color. Machine vision grading of agricultural commodities such as peanuts has greater accuracy grading than by human sight. Currently, pod ripeness is determined subjectively by human graders who compare pod ripeness color with a descriptive standard on a profile layout chart such as described in Williams et al, "A Non-Destructive Method for Determining Peanut Pod Maturity" (Peanut Science Vol. 8, 134–141, 1981.), incorporated herein by reference.

Additionally, greater precision in the grading, combined with the ability to evaluate samples more quickly provides minimally-trained personnel to perform a maturity grading task. In the absence of machine vision grading, less accurate shortcuts are often taken because of the large number of samples that must be graded in short periods of time. It is not uncommon for peanuts to gain about 300–500 pounds per acre in weight and 1 to 2% in grade in the week or week and a half before optimal harvest time. The increased gain in weight and grade can increase dollar per acre to the grower if the harvest time is accurately judged. Approximately 1.8 million acres of peanuts are produced in the United States each year. By the use of strategically placedmachine grading systems in peanut-producing counties, a much more highly reliable method of determining maturity of the peanut crop can be utilized.

2. Description of the Related Art

3-D vision systems for determining peanut pod maturity have been discussed in a paper entitled *Optics in Agriculture*, published in November of 1990 and incorporated herein by reference. Therein it was noted that pod ripeness color normally begins where the basal seed is attached to the hull. The colors gradually change from white to light-yellow to deep yellow to orange to brown to black with increasing maturity. These colors are subdivided in three to six classes, each for a total of 25 classes. Classes are based on the amount that one color has replaced another and represent approximately one-half week in the physiological age of the pod. Harvest decisions are primarily concerned with the last 13 of the classes that comprise the major ripeness colors. As in the use of humans in grading the maturity of the pods, it is necessary to correctly identify the advancing ripeness color in a machine vision system. The system described in the above-mentioned reference has drawbacks due to system cost and the complexity of providing like calibrations for the three cameras.

SUMMARY OF THE INVENTION

The present invention is designed to replace the human grading process currently used on about 65% of the peanut crop to determine the pod-maturity profile and, therefore, the best time to harvest the crop. In order to provide a complete or thorough inspection, a large sampling of a potentially harvestable peanut crop may be placed in a laboratory feeder. Pods are then conveyed, one at a time, through a chute to an inspection chamber. In the inspection chamber, the single pod rests on a pair of parallel, translucent rollers. The rollers are lighted from within so as to provide a backlight that removes shadows of the pod against its background. Main lights for inspection are positioned above the pod at approximately 45° to the camera lens. The camera captures an image and a stepper motor is actuated so as to rotate the parallel, translucent rollers. The rollers are rotated an amount which permits the pod to be rotated approximately one-third of a turn or 120°. Upon completion of rotation through this angle, a second image of the pod is made by the camera. The process is then repeated through rotation of the rollers for another 120°. A third image is then made. Upon completion of the third image, the process has then captured the entire surface area of the pod within the three views. A maturity class for the pod is then determined for each view by machine vision threshold and histogram techniques. The most advanced view is selected to represent the pod. The pod is then ejected from the inspection chamber onto a conveyor system which permits sorting the pods into respective maturity classes. At approximately 2 seconds per pod, the machine is more rapid than human inspectors and, more importantly, is consistent and removes subjectivity from the process. A pod-maturity profile is calculated immediately upon completion of a sample of approximately 200 pods.

In view of the foregoing summary, it is an object of the present invention to provide a device to present agricultural material such as peanut pods to a machine vision system. The machine system includes a support housing, a pair of rollers which are mounted in the support housing so that at least one of the rollers can be rotatable. A motor arrangement is connected to the pair of rollers so as to rotate the rollers while camera means record images of the pod while it is supported by and positioned between the pair of rollers. Views of the pod, as determined by the camera, are then utilized so as to determine maturity of the pod.

It is a further object of this invention to provide a feeder mechanism by which a plurality of pods can be stored in the feeder system and a single pod be transported to the rollers so that it may go through the image inspection and viewing process.

It is a further object of the present invention to provide the rollers as translucent material in which lights can be positioned internally or interiorly of the rollers so as to provide backlighting for the camera-imaging system.

A still further object of the present invention is to provide for rotation of the rollers, on which a single pod is positioned, so that three views of the pod can be taken. A first view of the pod is taken which covers approximately one-third of the surface area of the pod. Upon completion of a first view, the motor causes rotation of the rollers and, subsequently, rotation of the pod through an angle of approximately 120°. Upon completion of the rotation, a second view of the peanut pod is then made. Upon completion of the second view of the pod, the pod is then rotated, again by rotation of the rollers, to its final position for a third view through the machine vision system. Upon completion of the third view, a complete picture of the entire surface area of the pod is then available. The pod can then be classified into various maturity classes based on the best view of the imaging system. Immediately upon completion of the third view, the pod is ejected from the housing and a new pod is fed from the vibratory feeder mechanism so that the process can then be completed again. Each pod contained in the vibratory bowl is in turn fed through a chute mechanism into the inspection housing for completion of three views which, for each pod, covers its entire surface area.

LIST OF REFERENCE NUMERALS

Figure 1B:
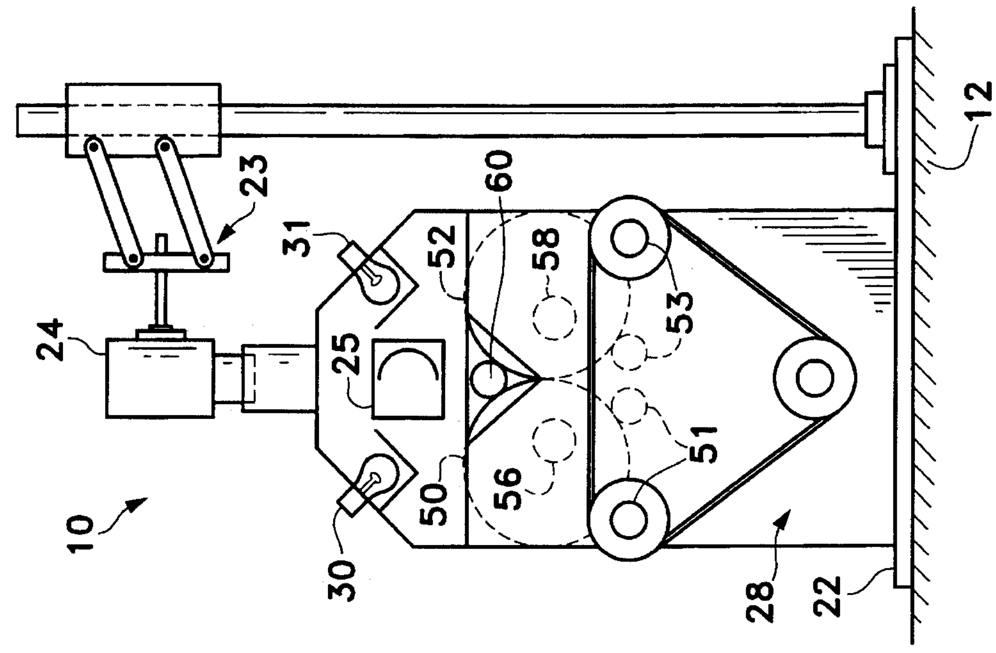
FIG. 1*b* is a schematic front view of the device.

10. Schematic for the machine vision system
12. Support stand
14. Vibratory feeder bowl
15. Support stand for vibratory feeder bowl
16. Passageway or chute
17. Gate Assembly
18. Measurement and inspection chamber
20. Adjustable height mechanism
23. Parallel linkage adjustment
24. Camera
25. Cooling fan for measurement and inspection chamber
26. Stepper motor
28. Support frame
30. Light source
31. Light source
40. Schematic of machine vision control system
41. Camera controller
42. Image monitor
44. Machine vision processor
46. Computer
50. Roller
51. Cradle for roller 50
52. Roller
53. Cradle for roller 52
56. Internal light source for roller 50
58. Internal light source for roller 52
60. Peanut pod
62. Pneumatic plunger
64. Computer RS-232 port
66. Digital I/O controller
68. Opto-isolated relays
70. Programmalbe timer
72. Stepper motor controller
74. Stepper motor

DETAILED DESCRIPTION OF THE INVENTION

Figure 1A:
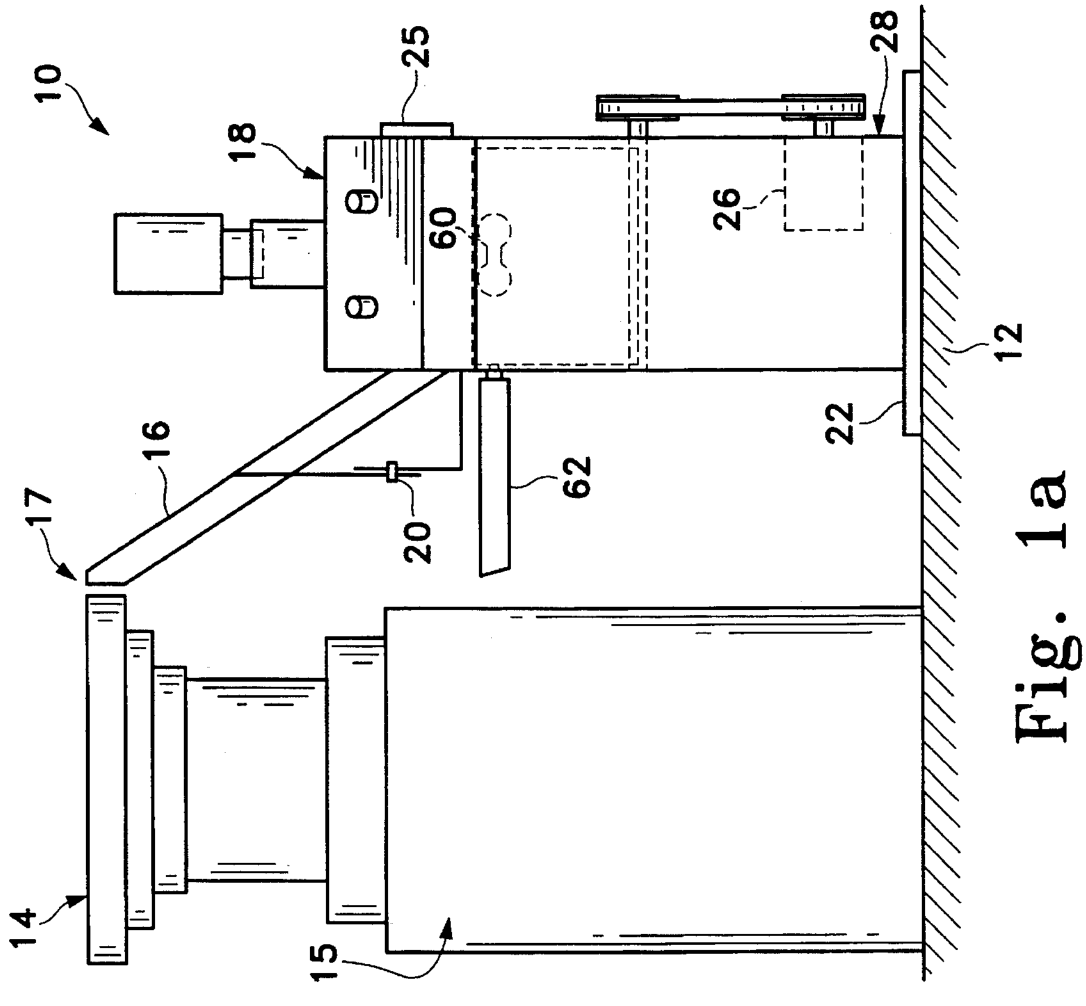
FIG. 1*a* is a schematic side view of the device.

In FIG. 1*a* and FIG. 1*b*, reference numeral 10 generally represents the schematic for the machine vision system. Reference numeral 12 indicates a stand for supporting the elements of the machine vision system and reference numeral 14 represents the vibratory feeder bowl in which the plurality of pods of peanuts are deposited prior to their inspection. Reference number 15 represents a stand for supporting the vibratory feeder bowl 14. A passageway is indicated at reference numeral 16 and extends between the vibratory bowl 14 and the measurement and inspection chamber 18. The passageway 16 provides a chute for the release of a single peanut pod through the chute and into the measurement and inspection chamber. An adjustable height mechanism 20 is provided so as to adjust the relationship of the passageway or chute 16 extending between the vibratory feeder bowl 14 and the measurement and inspection chamber 18. The measurement and inspection chamber rests on a support 22 which also supports the camera 24 through a parallel linkage adjustment 23. A stepper motor 26 is provided on a support frame 28. The camera is vertically displaced with respect to the measurement and inspection chamber by being positioned above and adjacent to the measurement and inspection chamber 18. Reference numeral 25 indicates a cooling fan for the measurement and inspection chamber 18.

Internally of the measurement and inspection chamber 18, a pair of rollers 50 and 52 rests on cradles 51 and 53 which are drivingly connected to the stepper motor 26. The pair of rollers 50 and 52 turn by friction against the cradles. Main light source 30 and 31 are shown as located internally of the measurement chamber and positioned between the camera 24 and the rollers 50 and 52. Ideally, the main light sources 30 and 31 are located at an angle of substantially 45° with respect to the camera lens. The rollers 50 and 52 are translucent. A light source 56 is located interiorly of roller 50 and a light source 58 is located interiorly of the roller 52.

Figure 2:
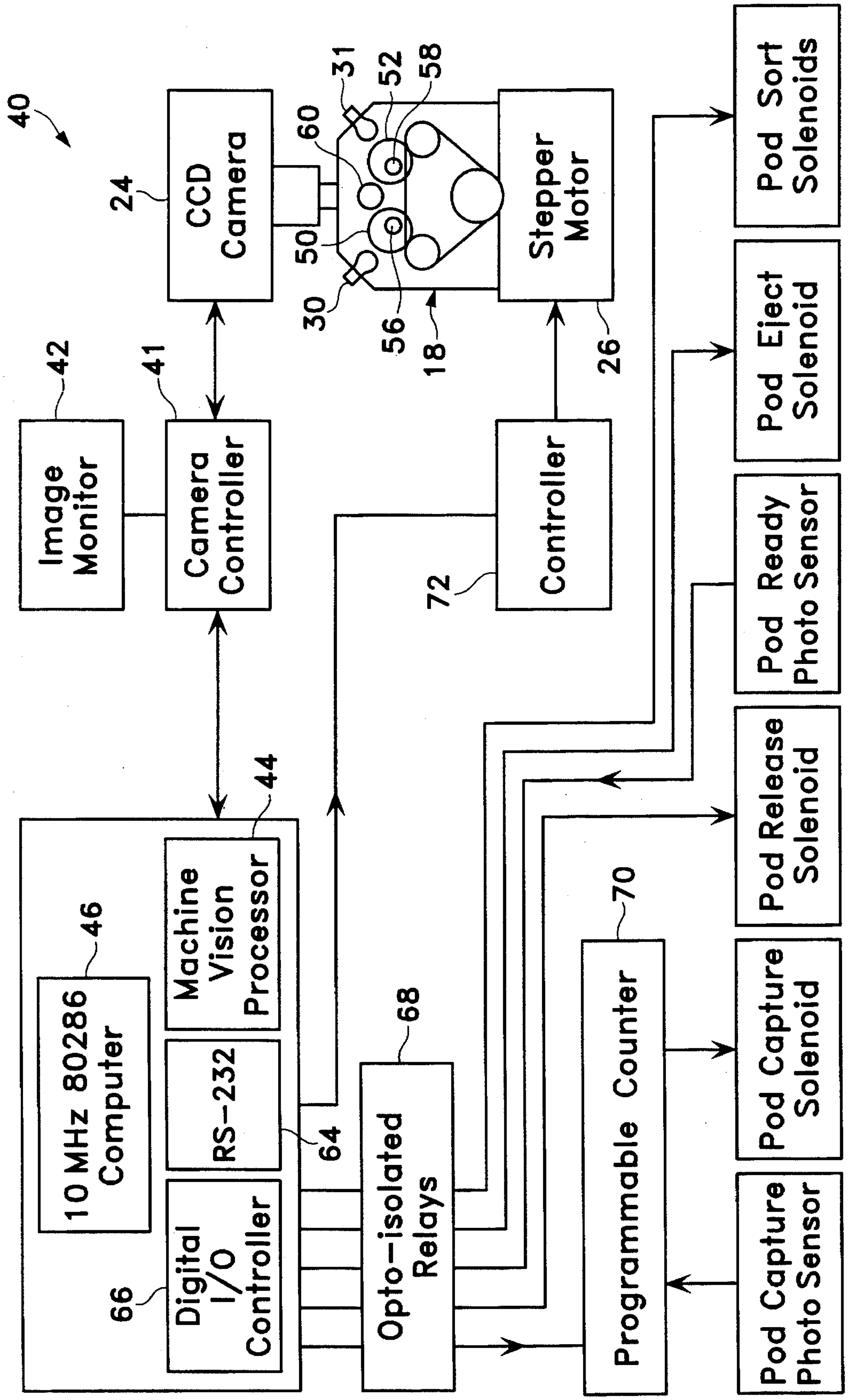
FIG. 2 represents schematic components of the machine vision system.

A schematic of the machine vision control system is indicated at reference numeral 40 in FIG. 2. Therein, the camera 24 is schematically represented as is the main light sources 30 and 31, back light sources 56 and 58, and rollers 50 and 52. A single peanut pod is indicated at reference numeral 60 centrally positioned within the measurement chamber 18. The output of the camera 24 is provided to the camera controller 41, machine vision processor 44, and computer 46. An image monitor 42 is available for viewing the image system per pod analyzed. The output of the computer RS-232 port 64 is provided to the stepper motor controller 72 and the stepper motor 26. A digital input/output controller 66, opto-isolated relays 68, and a programmable timer 70 provide control for peanut pod flow throughout the machine vision system.

In operation, a pod 60 is transmitted from the vibratory feeder bowl 14 through a gate assembly 17 to the passage or chute 16 and into the measurement chamber 18. In the inspection chamber, the pod 60 rests between the parallel transparent rollers 50 and 52. The position of the pod with respect to the camera lens is such that the pod is directly, vertically under the camera lens, while at the same time being in contact with each of the rollers 50 and 52, respectively, is illuminated so that shadows of the pod are removed from its background. A first step in the operation is that the camera 24 obtains a first image of the pod 60. Upon completion of the first image, the stepper motor 26 is actuated so as to rotate the rollers 50 and 52 through a predetermined angle corresponding to rotation of the pod 60 through 120° or approximately one-third of its surface area. Upon such rotation of the pod, the stepper motor is deactuated and the camera is actuated so as to obtain a second image of the pod. Again, as soon as the camera is actuated, the stepper motor 26 is actuated to again rotate the rollers through a predetermined angle which would rotate the pod approximately 120° so that a third and final image of the pod may be obtained upon actuation of the camera. Upon completion of the images representing the entire surface area of the peanut pod 60, the machine vision processor 44 and computer 46, determines a maturity class representing the grade of the peanut pod 60 for each view by the machine vision threshold and histogram techniques. The view of the pod 60 which represents its most advanced maturity stage is selected to represent the pod. The pod is then removed or ejected from the measurement and inspection chamber 18 by pneumatic plunger 62 so as to be transported to a sorting conveyor belt (not shown) for sorting into respective maturity classes. The process for imaging the entire surface area of each pod lasts approximately two seconds. The machine vision system is more rapid and accurate than human inspectors and removes subjectivity from the inspection process as its analysis is constant per pod with respect to the maturity classification. It should also be noted that present machine vision system, while described with respect to peanut pod inspection and grading, may also be used to scan agricultural commodities such as peanut kernels, or other small, substantially cylindrically-shaped objects in which there is a need to remove background shadows and view the entire surface of the kernel or other object.

What is claimed is:

1. A machine vision system to inspect an agricultural commodity comprising:

a support housing;

a pair of rollers mounted in said housing, at least one of said pair of rollers being rotatable, said pair of rollers are parallel to each other and translucent in order to provide a back light to remove shadows on said agricultural commodity during inspection and recordation of views of said agricultural commodity;

a first opening in said housing for receiving said commodity therethrough;

motor means connected to said pair of rollers for rotating at least one roller of said pair of rollers; and a single camera secured to said support housing so as to be substantially, vertically positioned above and adjacent to said pair of rollers, said agricultural commodity supported by and positioned between said pair of rollers, said camera actuated to inspect and record views of said agricultural commodity and thereby determine maturity of said agricultural commodity.

2. The system according to claim 1, further comprising: vibratory feeder means for holding multiple units of said agricultural commodity and dispensing a single unit of said agricultural commodity.

3. The system according to claim 2, further comprising: chute means connected to said vibrating feeder means and said housing for transporting said single unit of agricultural commodity through said first opening.

4. The system according to claim 1, wherein said pair of rollers are provided with a light source positioned interiorly therein.

5. The system according to claim 1, further comprising: a main light source positioned interiorly of said support housing.

6. The system according to claim 5, wherein said main light is positioned adjacent said unit of agricultural commodity and said camera.

7. The system according to claim 5, wherein said main light is positioned at an angle of substantially 45° to said camera.

8. The system according to claim 1, further comprising: a second opening in said housing through which said agricultural commodity is removed.

9. The system according to claim 1, wherein a first view of said agricultural commodity is recorded by said single camera, said motor means subsequently being actuated to rotate said at least one of said pair of rollers and thereby rotate said agricultural commodity positioned between said pair of rollers through an angle of approximately 120°, a second view of said agricultural commodity being recorded by said camera upon deactuation of said motor means, said motor means being actuated upon recordation of said second view to rotate said agricultural commodity through an angle of approximately 120° thereby permitting a third view of said agricultural commodity to be recorded by said single camera.

10. A method for inspecting and recording views of an agricultural commodity comprising:

introducing a single unit of an agricultural commodity into an inspection housing comprising a pair of parallel rollers wherein at least one of said pair of rollers is rotatable, said pair of rollers are translucent in order to provide a back light to prevent shadows on said agricultural commodity during inspection and recordation of views of said agricultural commodity, and said agricultural commodity is supported by and positioned between said pair of rollers;

recording a first view with a single camera to form a first image of said single unit of said agricultural commodity;

rotating said single unit of an agricultural commodity approximately 120° by a motor means connected to said pair of rollers for rotating said at least one roller of said pair of rollers;

recording a second view with said single camera to form a second image of said single unit of an agricultural commodity;

rotating said single unit of an agricultural commodity approximately 120° by a motor means connected to said pair of rollers for rotating said at least one roller of said pair of rollers; and recording a third view with said single camera to form a third image of said single unit of an agricultural commodity, whereby said first, second, and third views provide a complete image of said single unit of an agricultural commodity.

* * * * *